(12) United States Patent
Eichenberger et al.

(10) Patent No.: US 8,627,043 B2
(45) Date of Patent: *Jan. 7, 2014

(54) DATA PARALLEL FUNCTION CALL FOR DETERMINING IF CALLED ROUTINE IS DATA PARALLEL

(75) Inventors: Alexandre E. Eichenberger, Chappaqua, NY (US); Brian K. Flachs, Georgetown, TX (US); Charles R. Johns, Austin, TX (US); Mark R. Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,168

(22) Filed: Mar. 26, 2012

(65) Prior Publication Data

US 2012/0180031 A1 Jul. 12, 2012

Related U.S. Application Data (63) Continuation of application No. 12/649,751, filed on Dec. 30, 2009.

(51) Int. Cl.
*G06F 9/30* (2006.01)

(52) U.S. Cl.
USPC .......................................................... 712/3

(58) Field of Classification Search
USPC .......................................................... 712/3
See application file for complete search history.

(56) References Cited

U.S. PATENT DOCUMENTS

| 5,274,818 | A | | 12/1993 | Vasilevsky et al. | |
|---|---|---|---|---|---|
| 5,381,536 | A | * | 1/1995 | Phelps et al. | 711/168 |
| 5,381,550 | A | | 1/1995 | Jourdenais et al. | |
| 6,016,397 | A | | 1/2000 | Ogasawara et al. | |
| 6,106,575 | A | | 8/2000 | Hardwick | |
| 7,334,110 | B1 | * | 2/2008 | Faanes et al. | 712/3 |
| 7,363,472 | B2 | * | 4/2008 | Stuttard et al. | 712/225 |

(Continued)

FOREIGN PATENT DOCUMENTS

| GB | 2 409 064 A | 6/2005 |
|---|---|---|
| WO | WO 2006/044978 A2 | 4/2006 |

OTHER PUBLICATIONS

International Search Report and Written Opinion dated May 30, 2011 for International Application No. PCT/EP2010/069502, 11 pages.
USPTO U.S. Appl. No. 12/649,751, 1 page.

(Continued)

*Primary Examiner* — Robert Fennema
(74) *Attorney, Agent, or Firm* — Stephen J. Walder, Jr.; Matthew B. Talpis

(57) ABSTRACT

Mechanisms for performing data parallel function calls in code during runtime are provided. These mechanisms may operate to execute, in the processor, a portion of code having a data parallel function call to a target portion of code. The mechanisms may further operate to determine, at runtime by the processor, whether the target portion of code is a data parallel portion of code or a scalar portion of code and determine whether the calling code is data parallel code or scalar code. Moreover, the mechanisms may operate to execute the target portion of code based on the determination of whether the target portion of code is a data parallel portion of code or a scalar portion of code, and the determination of whether the calling code is data parallel code or scalar code.

9 Claims, 6 Drawing Sheets

(56) References Cited

U.S. PATENT DOCUMENTS

| | | | |
|---|---|---|---|
| 8,019,977 B2 * | 9/2011 | Gonion et al. | 712/225 |
| 2003/0037221 A1 | 2/2003 | Gschwind et al. | |
| 2007/0233766 A1 | 10/2007 | Gschwind | |
| 2008/0034357 A1 | 2/2008 | Gschwind | |
| 2009/0307656 A1 | 12/2009 | Eichenberger et al. | |
| 2010/0042789 A1 | 2/2010 | Gonion et al. | |
| 2011/0161623 A1 | 6/2011 | Eichenberger et al. | |

OTHER PUBLICATIONS

Andre, Francoise et al., "The Pandore Data-Parallel Compiler and its Portable Runtime", International Conference on High-Performance Computering and Networking (HPCN '95), Milan:Italy (1995), 8 pages.

Gibbs, Ben et al., "IBM eServer BladeCenter JS20 PowerPc 970 Programming Environment", Jan. 2005, www.redbooks.ibm.com/redpapers/pdfs/redp3890.pdf, 140 pages.

McCool, Michael D., "Data-Parallel Programming on the Cell BE and the GPU using the RapidMind Development Platform", Presented at the GSPx Multicore Applications Conference, Santa Clara, Oct. 31 to Nov. 2, 2006, pp. 1-9.

* cited by examiner

DATA PARALLEL FUNCTION CALL FOR DETERMINING IF CALLED ROUTINE IS DATA PARALLEL

This application is a continuation of application Ser. No. 12/649,751, filed Dec. 30, 2009, status pending.

BACKGROUND

The present application relates generally to an improved data processing apparatus and method and more specifically to mechanisms for providing a data parallel function call that determines if a called routine is data parallel or scalar.

Multimedia extensions (MMEs) have become one of the most popular additions to general-purpose microprocessors. Existing multimedia extensions can be characterized as Single Instruction Multiple Datapath (SIMD) units that support packed fixed-length vectors. The traditional programming model for multimedia extensions has been explicit vector programming using either (in-line) assembly or intrinsic functions embedded in a high-level programming language. Explicit vector programming is time-consuming and error-prone. A promising alternative is to exploit vectorization technology to automatically generate SIMD codes from programs written in standard high-level languages.

Although vectorization has been studied extensively for traditional vector processors decades ago, vectorization for SIMD architectures has raised new issues due to several fundamental differences between the two architectures. To distinguish between the two types of vectorization, the latter is referred to as SIMD vectorization, or SIMDization. One such fundamental difference comes from the memory unit. The memory unit of a typical SIMD processor bears more resemblance to that of a wide scalar processor than to that of a traditional vector processor. In the VMX instruction set found on certain PowerPC microprocessors (produced by International Business Machines Corporation of Armonk, N.Y.), for example, a load instruction loads 16-byte contiguous memory from 16-byte aligned memory, ignoring the last 4 bits of the memory address in the instruction. The same applies to store instructions.

There has been a recent spike of interest in compiler techniques to automatically extract SIMD or data parallelism from programs. This upsurge has been driven by the increasing prevalence of SIMD architectures in multimedia processors and high-performance computing. These processors have multiple function units, e.g., floating point units, fixed point units, integer units, etc., which can execute more than one instruction in the same machine cycle to enhance the uni-processor performance. The function units in these processors are typically pipelined.

Extracting data parallelism from an application is a difficult task for a compiler. In most cases, except for the most trivial loops in the application code, the extraction of parallelism is a task the application developer must perform. This typically requires a restructuring of the application to allow the compiler to extract the parallelism or explicitly coding the parallelism using multiple threads, a SIMD intrinsic, or vector data types available in new programming models, such as OpenCL.

Before a compiler can determine if a portion of code can be parallelized and thereby perform data parallel compilation of the code, the compiler must prove that the portion of code is independent and no data dependencies between the portion of code and other code called by that code exist. Procedure calls are an inhibiting factor to data parallel compilation. That is, data parallel compilation is only possibly when the compiler can prove that the code will correctly execute when data parallel optimizations are performed. When the code calls a procedure, subroutine, or the like, from different portions of code, object modules, or the like, that are not visible to the compiler at the time of compilation, such data parallel compilation is not possible since the compiler cannot verify that the code will correctly execute when the data parallel optimizations are performed.

Moreover, in a single instruction, multiple datapath (SIMD) architecture using a SIMD data parallel model, an important restriction implemented is that the architecture can only follow a single program flow at a time. This restriction makes data parallel compilation impossible in an object oriented model where the object inheritance might provide different methods for different portions of code subject to data parallelism optimizations.

SUMMARY

In one illustrative embodiment, a method, in a data processing system having a processor, for performing data parallel function calls in code during runtime. The method may comprise executing, in the processor, a portion of code having a data parallel function call to a target portion of code. The portion of code having the data parallel function call is calling code. The method may further comprise determining, at runtime by the processor, whether the target portion of code is a data parallel portion of code or a scalar portion of code and determining whether the calling code is data parallel code or scalar code. Moreover, the method may comprise executing the target portion of code based on the determination of whether the target portion of code is a data parallel portion of code or a scalar portion of code, and the determination of whether the calling code is data parallel code or scalar code.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for performing a data parallel call when calling a target procedure, routine, object model, etc. The data parallel call allows a compiler to assume that calls to target procedures, routines, object models, etc. that are not visible to the compiler at the time of compilation, are in fact data parallel, even if they are not. That is, the data parallel call allows the compiler to assume data parallelism unless the compiler can prove that the target procedure, routine, object model, etc. is not data parallel and must be executed in a scalar, i.e. sequential, manner. This also applies to a class of code where the compiler may not know, at compile/link time, which specific function will be called for each of the runtime objects, but where the compiler knows the set of functions that may be called.

With the data parallel call of the illustrative embodiments, at compilation time the compiler may replace calls in the source code with a data parallel call for calls to target procedures that are not visible by the compiler. In this way, the compiler assumes data parallelism of the target procedure of the call, but uses the data parallel call to determine, at runtime, whether the target procedure of the call is in fact data parallel or not. When the data parallel call is performed from a data parallel region of calling code (i.e. a region of code that has been determined by a compiler to be data parallel under the assumptions of the illustrative embodiments that code is data parallel unless proven to be not data parallel) to a procedure whose implementation is unknown, i.e. it is not clear whether the target called procedure is data parallel or not, the data parallel call performs analysis on the target procedure to determine if it is data parallel or not. Each vector slot of a single instruction multiple data (SIMD) vector register of a SIMD unit is investigated to generate a parallel execution group. That is, the target address of the target procedure, routine, etc., stored in the SIMD vector slot is identified and compared to the target addresses stored in the other SIMD vector slots to identify matches. All of the SIMD vector slots that access the same target address are placed in the same parallel execution group. A first target address in the SIMD vector slots that differs from a first SIMD vector slot's target address starts a next parallel execution group. Thus, a parallel execution group may be comprised of one or more instructions of one or more SIMD vector slots. For a particular parallel execution group, based on the comparison of target addresses, a mask value may be set to identify which SIMD vector slots have instructions targeting the address of the particular parallel execution group and may be executed in parallel.

Once a parallel execution group is generated by comparing target addresses of the SIMD vector slots, the target procedure, routine, etc. specified by the target address is analyzed to determine if it is a data parallel procedure, routine, etc. (hereafter simply referred to as a routine). To perform this analysis, a sentinel value may be retrieved and analyzed to determine if the sentinel value identifies the target routine as being a data parallel routine or a scalar routine. The sentinel value may be provided by a linker when generating the executable code based on characteristic information from metadata associated with the target routine. That is, a compiler may store characteristic information in metadata associated with the code of the target routine at compilation time indicating whether the compiler was able to apply data parallelism optimizations or not. This information may be used by the linker to generate a sentinel value that is stored in a known table data structure, at a known address, or the like. For example, in one illustrative embodiment, the sentinel value is stored at the target address-1 location in memory. The data parallel call of the illustrative embodiments, in such an implementation, is established such that it will always look at the target address-1 to get the sentinel value when determining if the target routine is data parallel or not.

If the sentinel value indicates that the target routine is a data parallel routine, the parallel execution group is executed in parallel using the mask value generated so that only those instructions associated with the SIMD vector slots identified as targeting the same target address are executed in parallel. The remaining SIMD vector slots are then executed in a subsequent iteration.

If the sentinel value indicates that the target routine is not data parallel, i.e. it is a scalar routine, then the arguments of the call to the target routine, for a first SIMD vector slot in the parallel execution group, are converted to scalar arguments using a scalar application binary interface (ABI), which is a low level scalar interface between the application code and the operating system. The target routine is then called in a scalar manner and result values are returned. The results that are returned are then converted back into data parallel return values.

In the case where the compiler is not certain of which specific functions in a set of functions are going to be called at runtime, the above process may also be applied to determine data parallelism at runtime based on the sentinel values. It should be noted, however, that when the compiler knows the set of functions being called, and when the compiler knows that each of the functions in this set have been parallelized, then the compiler may omit actual runtime testing of sentinel values, as it can guarantee its value at compile time.

It should further be noted that the linker may invoke, in turn, the compiler to re-generate code as more global information may be available during the linker invocation. For example, a traditional compiler typically processes one file at a time, whereas a linker typically processes all the statically-linked object files at a same time. Thus, re-invoking the compiler on each of the object files may allow the compiler to use more information that it can deduce from seeing all of the statically-linked object files at the same time.

The above process may be repeated for each SIMD vector slot that was not executed in the previous execution. Thus, if the sentinel value indicates a data parallel target routine, then the next SIMD vector slot that was not in the parallel execution group is the first SMID vector slot for the next iteration. The above process may be repeated such that this next SIMD vector slot's address may be compared with any remaining SIMD vector slots whose instructions have not completed to determine if an additional parallel execution group can be generated. If the sentinel value indicates that the target routine is scalar, then the next SIMD vector slot may be a SIMD vector slot that was in the parallel execution group but whose instruction was not actually completed due to the scalar execution, or may be a SIMD vector slot that was not in the original parallel execution group, depending upon the situation. The process is repeated until all of the instructions in the SIMD vector slots are completed at which time the operation repeats for a next set of values in the SIMD vector.

If the code that is calling the target routine is scalar code, i.e. not data parallel code, again the data parallel call may be used, however because the calling code is scalar, the target routine must be called in a scalar manner. In such a case, the data parallel call again causes the illustrative embodiments to investigate the sentinel value for the target routine and determine if the sentinel value indicates that the target routine is data parallel or not. If the target routine is scalar, then the target routine is called in a normal scalar manner by the scalar calling code. However, if the target routine is data parallel, then the arguments of the call are converted to a scalar form by using a mask that identifies a preferred SIMD vector slot. The target routine is then called with the specified mask such that the data parallel target routine is executed in a data parallel manner using the preferred SIMD vector slot. Return values are then converted back into a scalar form from the vector form.

In this way, the compiler when compiling the original source code can assume that all routines called by code being compiled are data parallel unless the compiler is able to analyze the target code and prove that the target code is not data parallel. This assumption may then be checked at runtime by investigating a sentinel value provided by the linker that identifies the target routine as being data parallel or not. Conversion of arguments based on whether or not a target routine is data parallel or not may then be made at runtime as a result of the analysis of the sentinel value.

The mechanisms of the illustrative embodiments are preferably implemented in conjunction with a compiler that transforms source code into code for execution on one or more processors capable of performing vectorized instructions, e.g., single instruction, multiple data (SIMD) instructions. One example of a data processing system in which SIMD capable processors are provided is the Cell Broadband Engine (CBE) available from International Business Machines Corporation of Armonk, N.Y. While the following description will assume a CBE architecture is used to implement the mechanisms of the illustrative embodiments, it should be appreciated that the present invention is not limited to use with the CBE architecture. To the contrary, the mechanisms of the illustrative embodiments may be used with any architecture in which array reference safety analysis may be used with transformations performed by a compiler. The CBE architecture is provided hereafter as only one example of one type of data processing system in which the mechanisms of the illustrative embodiments may be utilized and is not intended to state or imply any limitation with regard to the mechanisms of the illustrative embodiments.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
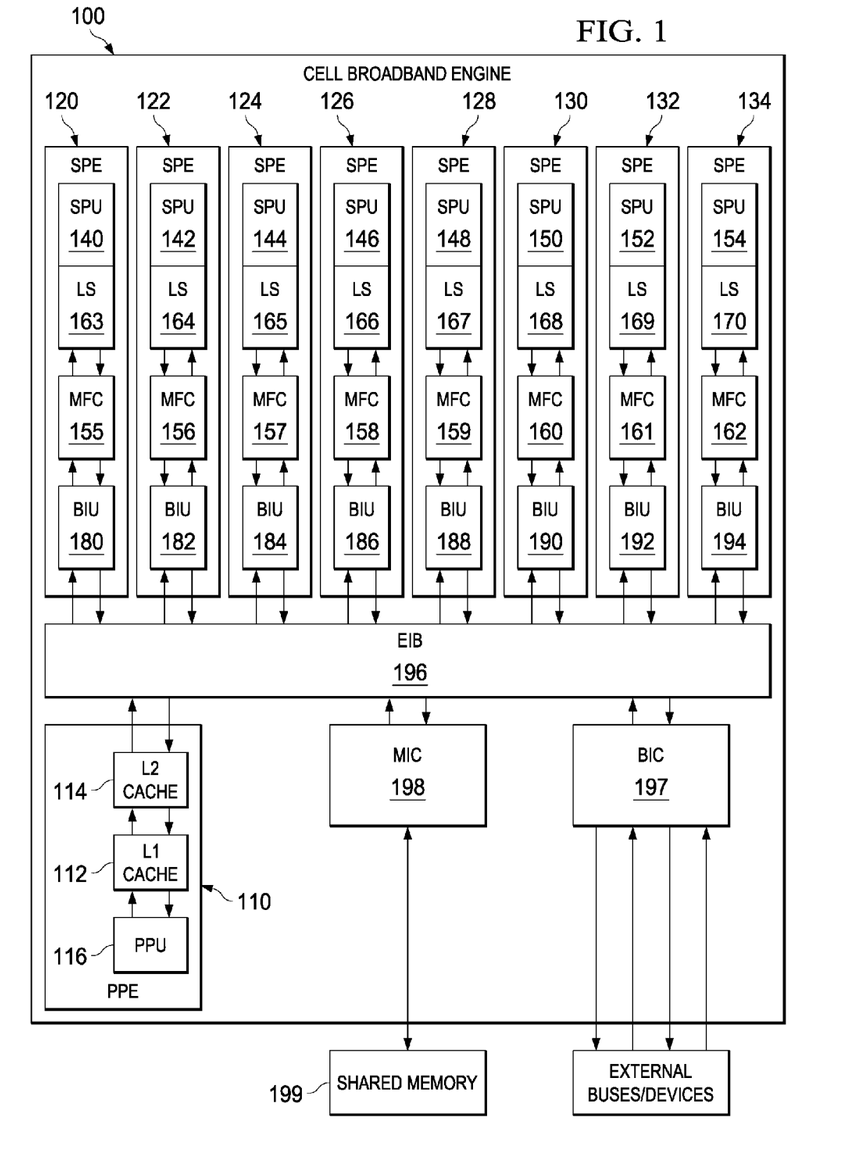
FIG. 1 is an exemplary block diagram of a data processing system in which aspects of the present invention may be implemented.

FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU executes vector instructions. In another aspect of the CBE architecture, the PPU supports the Power Instruction Set Architecture (ISA) data-parallel SIMD extensions, The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

With the data processing system 100 of FIG. 1, the processor 106 may have facilities for processing both integer (scalar) and floating point (vector) instructions and operating on both types of data. The scalar facilities may be used for integer processing and inter alia loop control and memory access control, for example. The vector facilities may be used for data parallel operations to take advantage of efficiencies in operating on data in a parallel manner.

Figure 2:
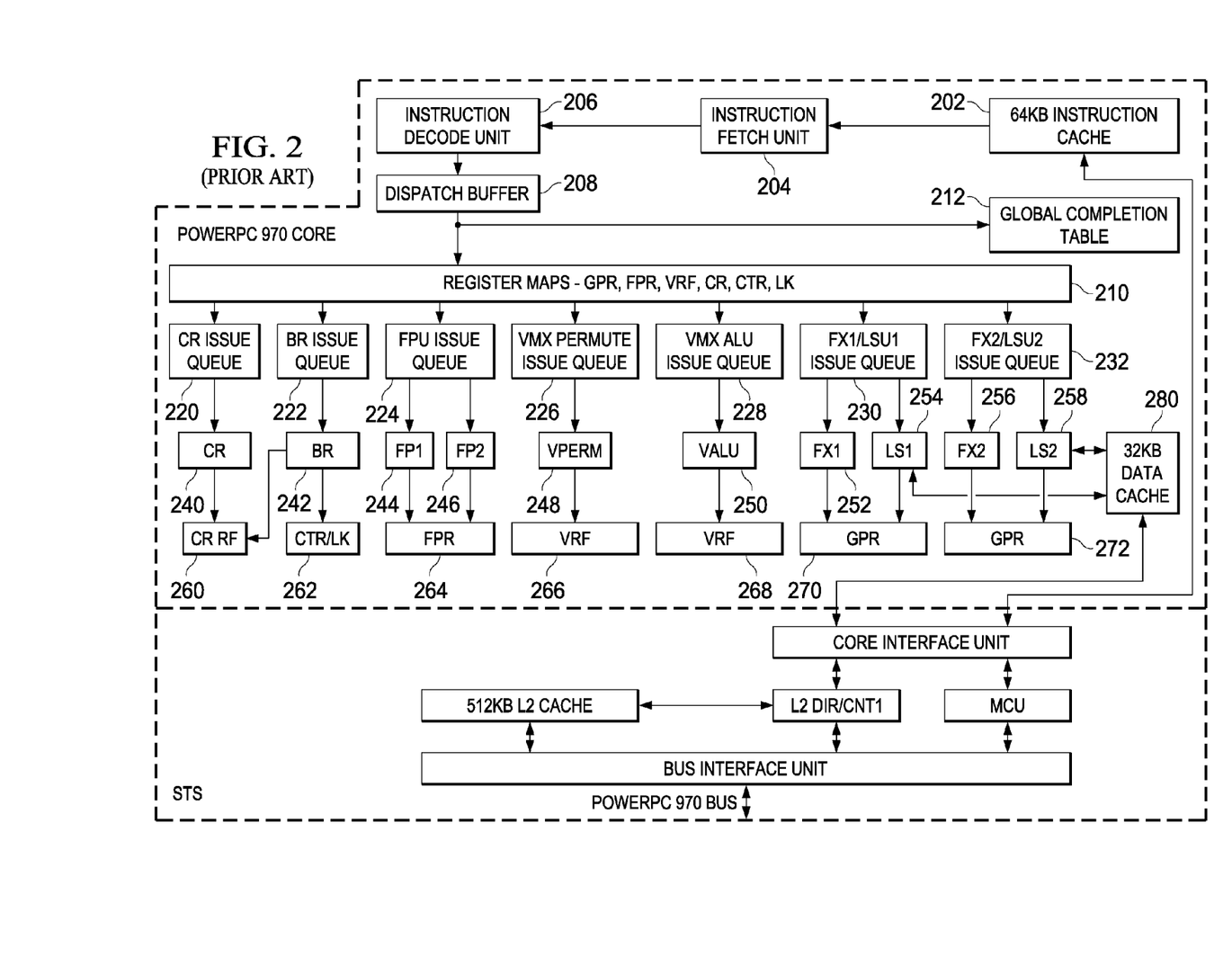
FIG. 2 is a block diagram of a processor architecture shown for purposes of discussion of the improvements made by the illustrative embodiments.

FIG. 2 is a block diagram of a processor architecture shown for purposes of discussion of the improvements made by the illustrative embodiments. The particular processor architecture shown in FIG. 2 is for the PowerPC™ 970 microprocessors available from International Business Machines Corporation of Armonk, N.Y. and described in the Redbook by Gibbs et al. entitled "IBM eServer BladeCenter JS20 PowerPC 970 Programming Environment," January 2005 (available at www.redbooks.ibm.com/redpapers/pdfs/redp3890.pdf).

As shown in FIG. 2, the processor architecture includes an instruction cache 202, an instruction fetch unit 204, an instruction decode unit 206, and a dispatch buffer 208. Instructions are fetched by the instruction fetch unit 204 from the instruction cache 202 and provided to the instruction decode unit 206. The instruction decode unit 206 decodes the instruction and provides the decoded instruction to the dispatch buffer 208. The output of the decode unit 206 is provided to both the register maps 210 and the global completion table 212. The register maps 210 map to one or more of the general purpose registers (GPRs), floating point registers (FPRs), vector register files (VRF), and the like. The instructions are then provided to an appropriate one of the issues queues 220-232 depending upon the instruction type as determined through the decoding and mapping of the instruction decode unit 206 and register maps 210. The issue queues 220-232 provide inputs to various ones of execution units 240-258. The outputs of the execution units 240-258 go to various ones of the register files 260-272. Data for use with the instructions may be obtained via the data cache 280.

Of particular note, it can be seen in the depicted architecture that there are separate issue queues and execution units for floating point, vector, and fixed point, or integer, instructions in the processor. As shown, there is a single floating point unit (FPU) issue queue 224 that has two output ports to two floating point execution units 244-246 which in turn have output ports to a floating point register file 264. A single vector permute issue queue 226 has a single output port to a vector permute execution unit 248 which in turn has a port for accessing a vector register file (VRF) 266. The vector arithmetic logic unit (ALU) issue queue 228 has one issue port for issuing instructions to the vector ALU 250 which has a port for accessing the vector register file 268. It should be appreciated that these issue queues, execution units, and register files all take up resources, area, and power.

Figure 3:
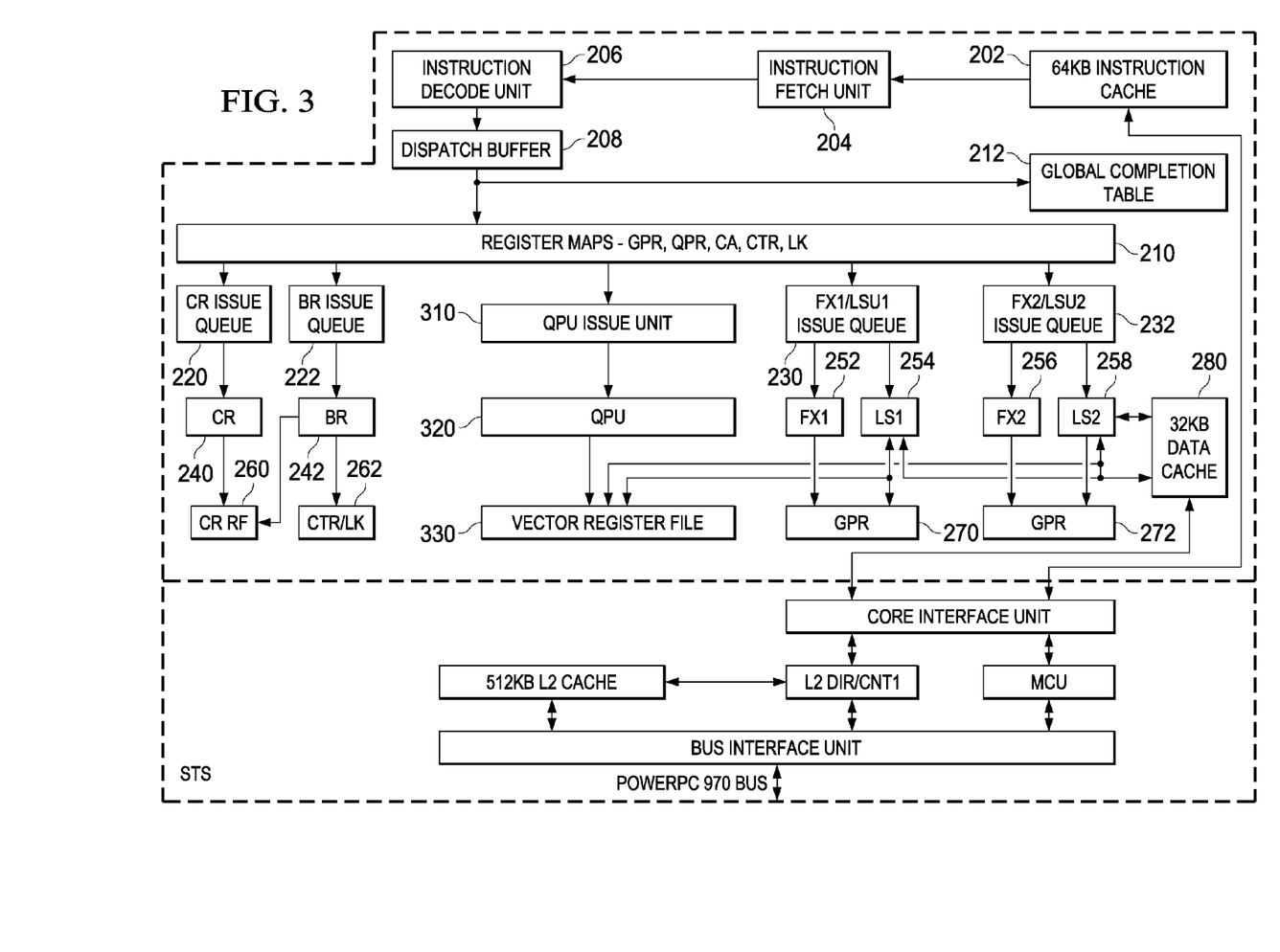
FIG. 3 is an exemplary diagram showing the alternative processor architecture in accordance with some illustrative embodiment.

With some illustrative embodiments, these issue units 224-228, the execution units 244-250, and register files 264-268 are replaced with a single issue queue, execution unit, and register file. FIG. 3 is an exemplary diagram showing the alternative processor architecture in accordance with some illustrative embodiment. The processor architecture shown in FIG. 3 is of a modified form of the PowerPC™ 970 architecture shown in FIG. 2 and thus, similar elements to that of FIG. 2 are shown with similar reference numbers. It should be appreciated that the example modified architecture is only an example and similar modifications can be made to other processor architectures to reduce the number of issue units, execution units, and register files implemented in these other architectures. Thus, the mechanisms of the illustrative embodiments are not limited to implementation in a modified form of the PowerPC™ 970 architecture.

As shown in FIG. 3, the modified architecture shown in FIG. 3 replaces the issue units 224-228 with a single quad-processing execution unit (QPU) issue unit 310. Moreover, the execution units 244-250 are replaced with the single quad-processing execution unit (QPU) 320. Furthermore, the register files 264-268 are replaced with a single quad-vector register file (QRF) 330. Because the quad-processing unit (QPU) can execute up to 4 data elements concurrently with a single instruction, this modified architecture not only reduces the resource usage, area usage, and power usage, while simplifying the design of the processor, but the modified architecture also increases performance of the processor.

In one illustrative embodiment, the mechanisms of the illustrative embodiment for providing a data parallel function call are provided primarily as logic elements in the QPU 320. Additional logic may be provided in one or more of the memory units LS1 and LS2 as appropriate. In other illustrative embodiments, the mechanisms of the illustrative embodiments may be implemented as logic in other elements of the modified architecture shown in FIG. 3, such as distributed amongst a plurality of the elements shown in FIG. 3, or in one or more dedicated logic elements coupled to one or more elements shown in FIG. 3. In order to provide one example of the implementation of the illustrative embodiments, it will be assumed for purposes of this description that the mechanisms of the illustrative embodiments are implemented as logic in the QPU 320 unless otherwise indicated.

Referring again to FIG. 1, the SPEs 120-134 and/or PPE 110 of the CBE 100 may make use of a SIMD architecture as shown in FIG. 3, for example, and may use vector instructions, e.g., SIMD instructions, and vector based data storage. Alternatively, other SIMD architectures may be used in which the processors utilize vector instructions having other types of vector elements. Thus, source code may be optimized by a compiler for execution on these SPEs 120-134 or PPE 110 with Power ISA or SIMD ISA extensions, by assuming data parallelism in the source code and verifying that assumption at runtime utilizing runtime data parallel mechanisms in accordance with the illustrative embodiments of the present invention. In some illustrative embodiments, it is preferably that the SIMD architecture of the data processing system that implements the illustrative embodiments support a preferred scalar slot in the SIMD vector register. That is, scalar operations are performed in the architecture using SIMD vectors where the preferred scalar slot contains valid instructions/data and all other slots (or elements) of the SIMD vector register are populated with "don't care" values, such as through a load-and-splat operation or other replication operation, a padding operation, or the like. One example of a processor architecture that supports such a preferred slot in a SIMD vector register is described in commonly assigned and co-pending U.S. patent application Ser. No. 12/134,495, entitled "Optimized Scalar Promotion with Load and Splat SIMD Instructions," the description of which is incorporated herein by reference.

With the mechanisms of the illustrative embodiments, when a compiler compiles a portion of code, the compiler assumes that any calls made by the compiler to other portions of code, such as in another object model, which are not visible to the compiler, e.g., the compiler is not made aware of the name of the target object, routine, procedure, etc., or the target portion of code is not accessible by the compiler at compile time, are in fact able to be executed in a data parallel manner. By "data parallel" what is meant is that there are not dependencies between iterations of execution of the portion of code, e.g., the object model, routine, procedure, etc., and there are no dependencies within the portion of code, e.g., in loops or such, that would prevent multiple iterations of the portion of code to be executed in parallel at substantially the same time. Similarly, such assumptions of data parallelism may be made in situations where the application code may call a set of known functions, but it is not known to the compiler at compile time exactly which functions will be called by the application code at runtime.

Typically, as noted above, a compiler cannot assume that code is data parallel code and instead must take a more conservative approach and consider all code to be scalar, i.e. not data parallel but rather must be executed sequentially, unless the code can be proven to be data parallel. The illustrative embodiments take an opposite approach and assume code is data parallel unless proven during runtime to be scalar, at which point mechanisms are provided for handling the scalar execution of the portion of code.

The compiler, for calls to other portions of code that are not visible to the compiler, or calls to portions of code that the compiler does not know at compile time will be called by the code at runtime, replaces the calls with a data parallel call in accordance with the illustrative embodiments. The data parallel call verifies the assumption of data parallelism of the target portion of code (hereafter referred to as the target routine), and converts arguments as necessary based on whether the target routine is determined at runtime to be actually data parallel or not, and also based on the nature of the portion of code calling the target routine, e.g., whether the calling code is data parallel or scalar code. A linker, which acts on the optimized and compiled code, links the code to other portions of code called by the code. As part of the linking process, the linker looks at the metadata associated with the portions of code called by the compiled code to determine if these other portions of code are data parallel or scalar. For example, the compiler may store in the metadata of the code an identifier of whether a data parallel optimization was applied to the compiled code or not and this identifier may be used by the linker to determine whether the code is data parallel or scalar code. Based on this determination, the linker may store a sentinel value at an address of the portion of code minus 1, in a table data structure, or at another known storage location, that may be used to determine if the called portion of code is data parallel or scalar. In general, any type of mapping may be used for storing this sentinel value, such as a hash set or any other data structure that allows two types of information to be linked together.

The resulting compiled and linked code, i.e. the executable code, may then be executed on a processor utilizing a vector architecture, such as a single instruction multiple data (SIMD) architecture, or the like. Preferably, the SIMD architecture utilizes a preferred scalar slot for scalar operations. Moreover, the architecture may include a SIMD unit, which may be a function unit, similar to a floating point unit, fixed point unit, or the like, in the processor architecture, which comprises hardware logic for verifying data parallelism of code, as described in greater detail hereafter. This hardware logic may operate at runtime based on the data parallel function calls in the executable code to verify the data parallel nature of the called target routine and to execute the called target routine accordingly.

Figure 4:
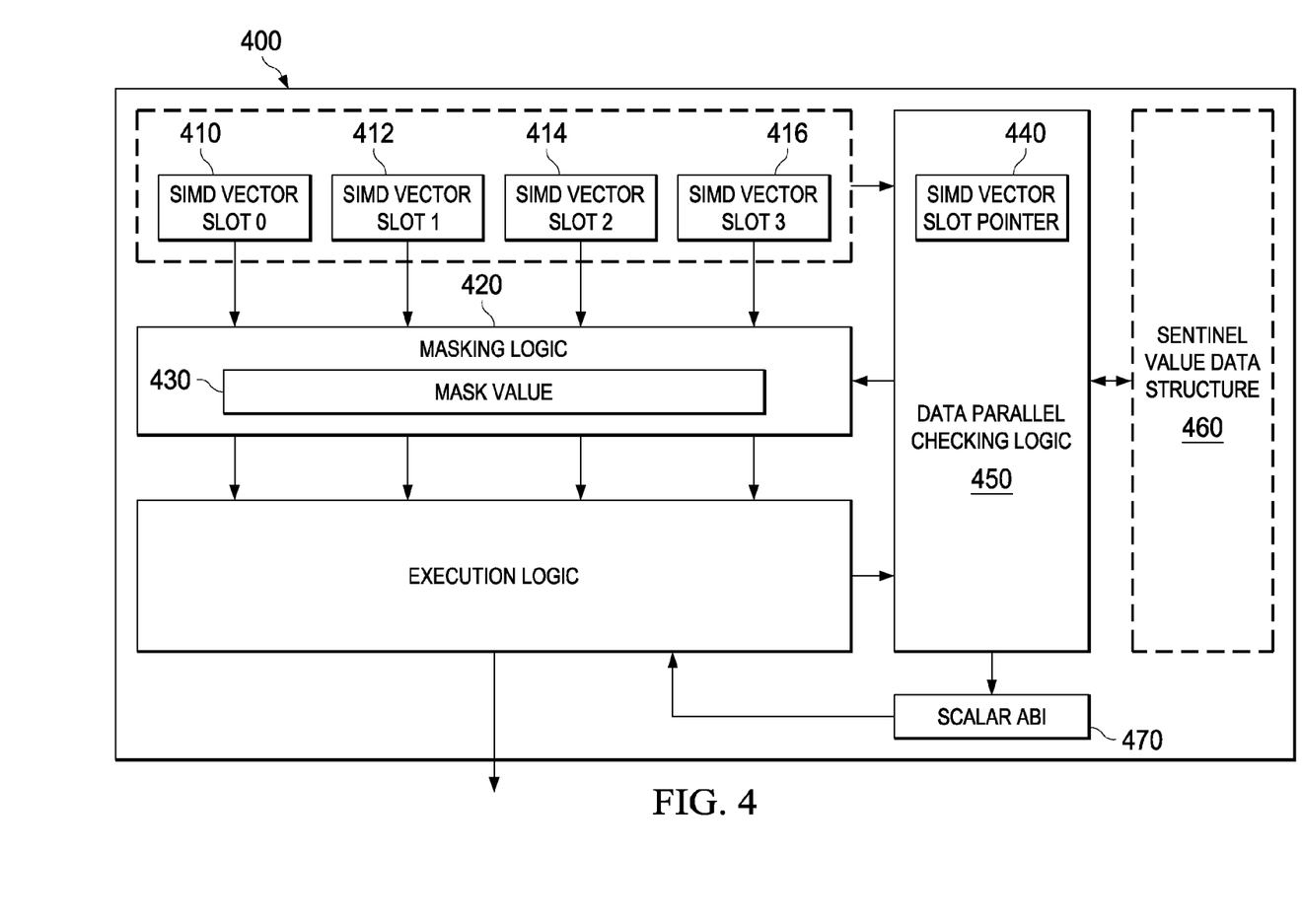
FIG. 4 is an example block diagram illustrating a SIMD unit having logic for performing the various hardware logic operations in accordance with one illustrative embodiment.

FIG. 4 is an example diagram of a SIMD unit in which hardware logic may be provided for performing, or at least assisting with the performance, of a data parallel call in accordance with one illustrative embodiment. For example, the SIMD unit may be, or may be part of, the QPU 320 in FIG. 3. As a further example, the SIMD unit may be, or may be part of, the VPERM 248 and/or the VALU 250 in FIG. 2. The example SIMD unit shown in FIG. 4 is a 4-wide SIMD unit in which there are 4 SIMD vector slots per vector. It should be appreciated that the illustrative embodiments are not limited to use with a SIMD unit or with a 4-wide SIMD unit. To the contrary, the mechanisms of the illustrative embodiments may be implemented in other architectures, such as multi-threaded architectures, or the like, that may or may not use SIMD units. Furthermore, other widths of SIMD units may be utilized without departing from the spirit and scope of the illustrative embodiments. For example, a 2-wide, 8-wide, 16-wide, or the like, SIMD unit may be utilized.

Furthermore, as mentioned above, the mechanisms of the illustrative embodiments may be implemented entirely in software or in a combination of hardware and software without departing from the spirit and scope of the illustrative embodiments. For example, software may implement the data parallel checking logic 450 of FIG. 4 while the other mechanisms in FIG. 4 may be implemented in hardware which supports the operation of the data parallel checking logic 450. For purposes of the following description, however, it will be assumed that the elements shown in FIG. 4 are implemented as hardware logic within a processor of a data processing system.

As shown in FIG. 4, the SIMD unit 400 includes SIMD vector slot registers 410-416. The data in each SIMD vector slot register 410-416 may correspond to a separate iteration of a loop within a given parallel execution group/section. This data may comprise an address of an instruction/data that is the target of the operation being performed by the parallel execution associated with that SIMD vector slot register 410-416. Thus, for example, SIMD slot 0 410 may store address information for a first instruction that is to be executed in parallel, SIMD slot 1 412 may store address information for a second instruction that is to be executed in parallel, and the like. The address information in each SIMD slot 0-3 410-416 may be the same or different. For example, if multiple executions of a same instruction are being performed in parallel, they may all reference the same address. This may occur, for example, if multiple iterations of a loop are being performed in parallel.

The SIMD vector slot registers 410-416 are coupled to masking logic 420. The masking logic allows software or hardware to prevent a corresponding SIMD vector slot register 410-416 from contributing to the parallel execution. Initially, the masking logic 420 allows all of the SIMD vector slots 410-416 to contribute to the parallel execution results. However, in the event that determination is made that a particular SIMD vector slot 410-416 should not be allowed to complete its execution, e.g., a particular SIMD vector slot 410-416 is not part of a parallel execution group or only a preferred SIMD vector slot is to be utilized, the SIMD vector slot 410-416 corresponding to a parallel execution that is not to be completed is blocked by the setting of a mask value 430 in the masking logic 420 that identifies which SIMD vector slots 410-416 may contribute to a result of the parallel execution. For example, initially, the mask value may be set to "1 1 1 1" with bits in the mask value 430 being set to "0" when a determination is made that a corresponding SIMD vector slot 410-416 is not part of the parallel execution group or only a preferred SIMD vector slot, e.g., slot 410, for scalar operations is to be used. It should be noted that the values 0 and 1 in the present description are only exemplary of values that can be used to indicate the logical values of, respectively, false and true. In other illustrative embodiments, other representations may be utilized, such as the values 0 and −1, two disjoint set of integer values, two disjoint set of floating point values, or the like.

The data parallel checking logic 450 operates on the address information of the target routines identified by the addresses in the SIMD vector slots 410-416, and determines how to set the bits in the mask value 430 of the masking logic 420 so that appropriate operations associated with select SIMD vector slots 410-416 may be allowed to complete execution while others are blocked. For the calling code, instructions are included in the code, such as by the compiler, to move execution from a scalar mode (in which the execution begins) to a data parallel processing mode and generate an initial mask for the data parallel processing mode. When the data parallel region of code is done executing, instructions are included in the code to move from the data parallel processing mode back into the scalar mode.

In some embodiments, all code may be assumed to be parallelized (whether it is actually or not), in which case each call may be tested in this manner, whether it is part of a data parallel portion/region of code or not. In other illustrative embodiments, the compiler may statically generate up to three versions of each portion of code, e.g., functions, one that is only sequential code, one that is data parallel code, and one that is data parallel code with mask values associated with it. The compiler may call directly the sequential version when the compiler knows that it calls a function in a static context. The compiler may directly call the data parallel version when the compiler knows that this data parallel function is applicable in a given context. The compiler may call the data parallel version with masks, i.e. the mode described above, as a default if the other two situations are not discernable to the compiler.

The data parallel checking logic 450 operates in response to a data parallel call being performed from one of a scalar region or a data parallel region of calling code. The data parallel call is either an instruction, or includes an instruction, that informs the data processing system that a data parallel call is in progress. A data parallel region is region of code that has been determined by a compiler to be data parallel, i.e. there are no data dependencies that prevent parallel execution of more than one iteration or thread at substantially a same time, under the assumptions of the illustrative embodiments that code is data parallel unless proven to be not data parallel. The data parallel call is a call of a portion of code, e.g., a routine, procedure, object, or the like, whose implementation is unknown, i.e. it is not clear whether the target called routine is data parallel or not.

In response to a data parallel call, the data parallel checking logic 450 compares the target address of target portion of code being called by the data parallel call, to the target addresses stored in the other SIMD vector slots 410-416. The addresses stored in the SIMD vector slot 412-416, for example, are compared to the first SIMD vector slot 410 in sequence and a determination is made as to whether they have a matching address. Each SIMD vector slot 412-416 having a matching address is added to a same parallel execution group until a first non-matching address in a SIMD vector slot 412-416 is encountered. Only those having matching target addresses stored in the SIMD vector slots 410-416 are included in the same parallel execution group while other SIMD vector slots 410-416 not having a matching address are excluded from the parallel execution group.

A pointer 440 is set based on the identification of matching addresses in SIMD vector slots 410-416. The pointer 440 points to the first SIMD vector slot 412-416 that does not have a matching target address as the first SIMD vector slot 410. This pointer 440 thus, points to the first SIMD vector slot 412-416 for a next parallel execution group for a subsequent pass, as discussed hereafter.

Once a parallel execution group is generated in this manner, in accordance with one illustrative embodiment, a determination is made by the logic 450 as to whether the target code corresponding to the target address of the parallel execution group is data parallel code or scalar code. This determination involves looking at a sentinel value associated with the portion of code which identifies whether the code was optimized using data parallel optimizations by the compiler. The sentinel value is stored at a known location, such as at the address-1 location for the address of the calling code (or target portion of code as discussed hereafter), in a table data structure 460, or the like.

The calling code is either data parallel or scalar code as may be determined by the compiler at compilation time. The compiler may insert instructions into the code defining sections or regions of the code as data parallel code or scalar code. Unless data parallel code instructions are inserted into the code, either by the compiler or by the code writer, the code is considered to be scalar. Based on the setting of the sentinel value for the target code and the nature of the calling code, the data parallel checking logic 450 determines how to perform the data parallel call. For example, if the sentinel value corresponding to the target address indicates that the target portion of code (routine) is data parallel code, and the calling code is determined to be data parallel code, the data parallel call for the corresponding SIMD vector slot 410-416 is executed in parallel for each of the SIMD vector slots 410-416 that are part of the parallel execution group while other SIMD vector slots 410-416 are blocked from contributing to the execution results during this pass. This blocking may be performed by the logic 450 setting a mask bit in the mask value 430 of the masking logic 420 to block certain SIMD vector slots 410-416 that are not part of the current parallel execution group. The calls/instructions associated with the remaining SIMD vector slots 410-416 are then executed in a subsequent iteration.

If the sentinel value indicates that the target routine is not data parallel, i.e. it is a scalar routine, then the arguments of the call to the target routine, for a first SIMD vector slot, e.g., SIMD vector slot 410, in the parallel execution group, are converted to scalar arguments using a scalar application binary interface (ABI) 470, which is a low level scalar interface between the application code and the operating system. The logic 450 then causes the target portion of code (routine) to be called in a scalar manner and result values are returned. The results that are returned are then converted back into data parallel return values by the logic 450. For example, the scalar ABI 470 may provide a vector to a handler, such as the calling instruction, that converts the vector arguments to scalar arguments, such as by using a preferred vector slot for scalar arguments.

As an example, assume that there is a vector of 4 addresses, vector slots 0, 1, and 3 have been determined to have the same address to a scalar routine or function, and there is a loop iterating over all of the vector slots. For each slot S, in turn, a determination is made as to whether the corresponding mask is on/off. When the mask is on, each of the parameters required by the function are moved to where they are expected by the scalar function (i.e. in the scalar register or preferred scalar vector slot). The function can then be called and the return value (if any) is place dint eh slot S of the SIMD vector register holding the return value.

The above process is then repeated for each SIMD vector slot that was not executed in the previous execution. Thus, if the sentinel value indicates a data parallel target routine, then the next SIMD vector slot that was not in the parallel execution group, as pointed to by the pointer 440, is the first SMID vector slot for the next pass or iteration. The above process may be repeated such that this next SIMD vector slot's address may be compared with any remaining SIMD vector slots whose instructions have not completed, to determine if an additional parallel execution group can be generated. If the sentinel value indicates that the target routine is scalar, then the next SIMD vector slot may be a SIMD vector slot that was in the parallel execution group but whose instruction was not actually completed due to the scalar execution, or may be a SIMD vector slot that was not in the original parallel execution group, depending upon the situation. The process is repeated until all of the instructions in the SIMD vector slots 410-416 are completed, at which time the operation repeats for a next set of values in the SIMD vector register.

If the calling code that is calling the target routine is scalar code, i.e. not data parallel code, the data parallel call may again be used. However, because the calling code is scalar, the target portion of code is called in a scalar manner. In such a case, the data parallel call again causes the logic 450 to investigate the sentinel value for the target portion of code (routine) and determine if the sentinel value indicates that the target routine is data parallel or not. If the target routine is scalar, then the target routine is called in a normal scalar manner by the scalar calling code. However, if the target routine is data parallel, then the arguments of the call are converted to a scalar form by using the mask value 430 to mask all but a preferred SIMD vector slot, e.g., SIMD vector slot 410 using mask value (1 0 0 0). The target routine is then called with the specified mask value 430 such that the data parallel target routine is executed in a data parallel manner using the preferred SIMD vector slot 410.

Return values are then converted back into a scalar form from the vector form, such as providing a vector for the return processing. Return values are typically found in one register, dictated by the convention that holds for the machine/operating system/compiler, or any combination thereof. For example, a scalar function may be expected to return its return value in register 3; and a SIMD parallel function may be expected to return its value in SIMD vector register 3 (same number, but different register files). Then, when returning from scalar code, the value in scalar register r3 is moved to the Sth slot of the SIMD vector register (where S corresponds to the slot being processed at this time by the scalar function). Technically, values can be moved from one register file to another register file using special move instructions (when available) or via memory (by first storing the value from one register file into memory, and then reading the value from memory into the second register file).

Figure 5:
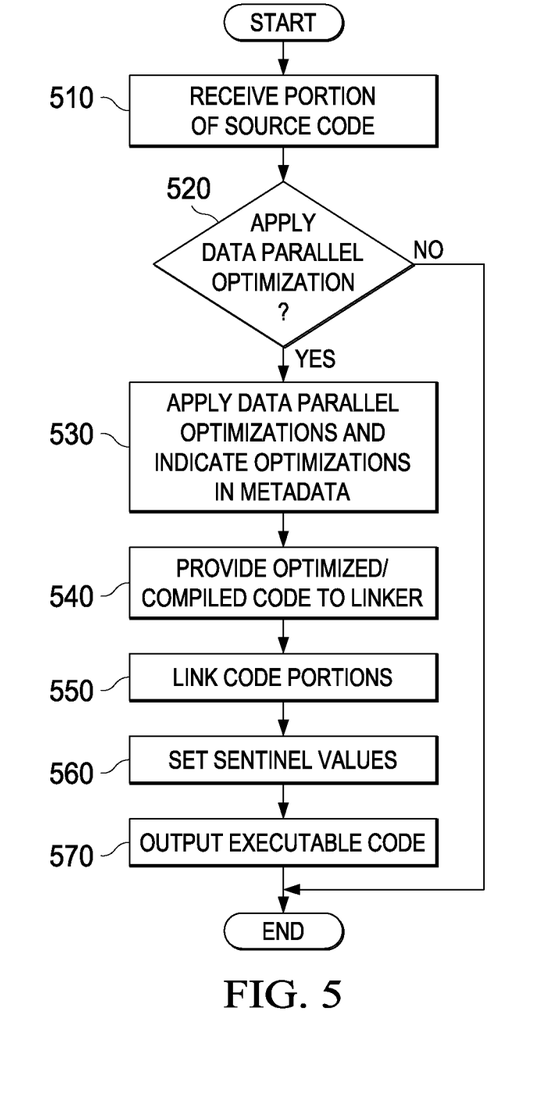
FIG. 5 is a flowchart outlining an example operation for compiling and linking code to generate executable code.

FIG. 5 is a flowchart outlining an example operation for compiling and linking code to generate executable code. As shown in FIG. 5, the operation starts with receiving a portion of source code (step 510). A determination is made by the compiler as to whether data parallel optimizations may be applied to the portion of source code (step 520). If so, the data parallel optimizations, such as data parallel if conversion or the like, are applied and metadata is created for the portion of code indicating that the data parallel optimization has been applied (step 530). Thereafter, the portion of code is provided to a linker (step 540). The linker links the portion of code (calling code) with other portions of code (target code) called by the calling code (step 550). The linker sets sentinel values for each portion of code based on the metadata associated with the portions of code to thereby indicate whether the portions of code are data parallel or scalar code (step 560). The resulting executable code is then output for execution by a processor (step 570). The operation then terminates.

Figure 6:
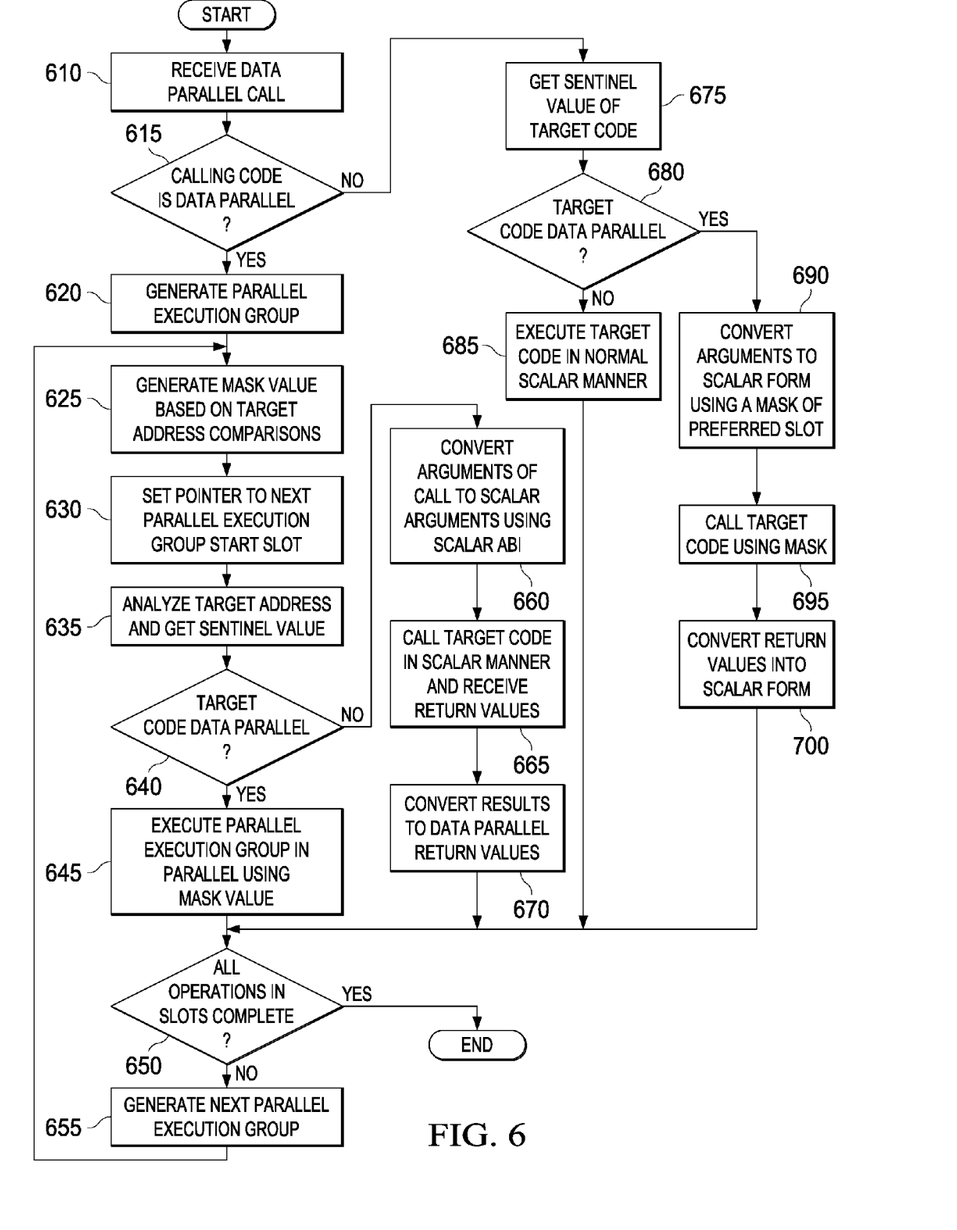
FIG. 6 is a flowchart outlining an operation for executing a data parallel call in accordance with one illustrative embodiment.

FIG. 6 is a flowchart outlining an operation for executing a data parallel call in accordance with one illustrative embodiment. FIG. 6 outlines an operation that can be performed entirely in software executed by one or more processors of a data processing system, entirely in hardware of one or more processors of a data processing system, or in any combination of hardware and software. In an entirely software approach, it should be appreciated that the software may be stored in a memory of other storage device and may be executed from that memory by one or more processors to perform the various operations and functions described in the flowchart. Similarly, for a software and hardware embodiment, some of the operations and functions described may be performed in software while others are performed in hardware.

It should be noted that the separation of work between the compiler and linker in FIG. 6, and in the present description, is only an example and is not intended to state or imply any limitations on the particular implementations of the present invention envisioned or encompassed by the present invention. To the contrary, all of the work may be done by the linker (possibly calling in turn the compiler), by the compiler, or any combination of the linker and compiler, such as the distribution of work described herein.

As shown in FIG. 6, the operation starts by receiving a data parallel call (step 610). A determination is made as to whether the data parallel call is from calling code that is data parallel or not (step 615). As mentioned above, this may be done by looking at the sentinel value for the calling code and determining if the sentinel value indicates that the calling code is data parallel or not, for example.

If the calling code is data parallel code, the target address in each SIMD vector slot of the SIMD unit is investigated to generate a parallel execution group (step 620). As mentioned above, this may involve, for example, the target address of the target portion of code (target code) stored in the SIMD vector slot being identified and compared to the target addresses stored in the other SIMD vector slots to identify matches. All of the SIMD vector slots that access the same target address are placed in the same parallel execution group. A first target address in the SIMD vector slots that differs from a first SIMD vector slot's target address starts a next parallel execution group. Thus, a parallel execution group may be comprised of one or more instructions of one or more SIMD vector slots. For a particular parallel execution group, based on the comparison of target addresses, a mask value may be set (step 625) to identify which SIMD vector slots have instructions targeting the address of the particular parallel execution group and may be executed in parallel.

A pointer to a first SIMD vector slot of a next parallel execution group is set based on the generation of the parallel execution group (step 630). Once a parallel execution group is generated by comparing target addresses of the SIMD vector slots, the target code specified by the target address is analyzed (step 635) to determine if it is data parallel code (step 640). To perform this analysis, for example, a sentinel value associated with the target address may be retrieved and analyzed to determine if the sentinel value identifies the target code as being a data parallel routine or a scalar routine. If the sentinel value indicates that the target code is data parallel code, the parallel execution group is executed in parallel using a mask value generated so that only those instructions associated with the SIMD vector slots identified as targeting the same target address are executed in parallel (step 645). A determination is then made as to whether all of the operations associated with the SIMD vector slots have completed (step 650). If so, the operation terminates. Otherwise, a next parallel execution group is then generated by resetting the mask values, thereby generating a new mask, and starting the operation again using the SIMD vector slot pointed to by the pointer set in step 630 (step 655). The remaining SIMD vector slots are then executed in a subsequent iteration.

If the sentinel value indicates that the target code is not data parallel (step 640), i.e. it is scalar code, then the arguments of the call to the target code, for a first SIMD vector slot in the parallel execution group, are converted to scalar arguments using a scalar ABI (step 660). The target routine is then called in a scalar manner and result values are returned (step 665). The results that are returned are then converted back into data parallel return values (step 670) and the operation goes to step 650.

The above process is then repeated for each SIMD vector slot that was not executed in the previous execution. Thus, if the sentinel value indicates a data parallel target routine, then the next SIMD vector slot that was not in the parallel execution group is the first SMID vector slot for the next iteration. The above process may be repeated such that this next SIMD vector slot's address may be compared with any remaining SIMD vector slots whose instructions have not completed to determine if an additional parallel execution group can be generated. If the sentinel value indicates that the target routine is scalar, then the next SIMD vector slot may be a SIMD vector slot that was in the parallel execution group but whose instruction was not actually completed due to the scalar execution, or may be a SIMD vector slot that was not in the original parallel execution group, depending upon the situation. The process is repeated until all of the instructions in the SIMD vector slots are completed at which time the operation repeats for a next set of values in the SIMD vector.

If the calling code that is calling the target routine is scalar code (step 615), i.e. not data parallel code, again the data parallel call may be used, however because the calling code is scalar, the target routine must be called in a scalar manner. In such a case, the data parallel call again causes the illustrative embodiments to investigate the sentinel value for the target routine (step 675) and determine if the sentinel value indicates that the target routine is data parallel or not (step 680). If the target routine is scalar, then the target routine is called in a normal scalar manner by the scalar calling code (step 685). However, if the target routine is data parallel, then the arguments of the call are converted to a scalar form by using a mask that identifies a preferred SIMD vector slot (step 690). The target routine is then called with the specified mask such that the data parallel target routine is executed in a data parallel manner using the preferred SIMD vector slot (step 695). Return values are then converted back into a scalar form from the vector form (step 700) and the operation branches to step 650.

In this way, the compiler when compiling the original source code can assume that all routines called by code being compiled are data parallel unless the compiler is able to analyze the target code and prove that the target code is not data parallel. This assumption may then be checked at runtime by investigating a sentinel value provided by the linker that identifies the target routine as being data parallel or not. Conversion of arguments based on whether or not a target routine is data parallel or not may then be made at runtime as a result of the analysis of the sentinel value.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system having a processor, for performing data parallel function calls in code during runtime, comprising:

executing, in the processor, a portion of code having a data parallel function call to a target portion of code, wherein the portion of code having the data parallel function call is calling code;

determining, at runtime by the processor, whether the target portion of code is a data parallel portion of code or a scalar portion of code;

determining, at runtime by the processor, whether the calling code is data parallel code or scalar code; and executing the target portion of code, where the manner of execution of the target portion of code is based on the determination of whether the target portion of code is a data parallel portion of code or a scalar portion of code, and the determination of whether the calling code is data parallel code or scalar code;

wherein if the calling code is scalar code, and the target portion of code is a data parallel portion of code, the processor is configured to execute the target portion of code by calling the target portion of code with a mask to identify a preferred slot of a vector register.

2. The method of claim 1, wherein if the calling code is data parallel code, and the target portion of code is a data parallel portion of code, executing the target portion of code comprises:

executing, by the processor, the target portion of code in a data parallel manner using one or more parallel execution groups.

3. The method of claim 1, wherein if the calling code is scalar code, and the target portion of code is a data parallel portion of code, executing the target portion of code comprises:

converting results of the target portion of code to a scalar format.

4. The method of claim 1, wherein determining, at runtime by the processor, whether the target portion of code is a data parallel portion of code or a scalar portion of code comprises retrieving a sentinel value associated with the target portion of code and analyzing the sentinel value to determine if the sentinel value indicates the target portion of code to be data parallel or scalar.

5. The method of claim 4, wherein the sentinel value is stored in a known location relative to an address of the target portion of code.

6. The method of claim 4, wherein the sentinel value is generated by one of a compiler or a linker based on whether or not the compiler successfully applied a data parallel optimization to the target portion of code.

7. The method of claim 1, wherein the portion of code is executed as part of a parallel execution group comprising a plurality of iterations of the portion of code, each iteration in the plurality of iterations being associated with a separate vector register slot or separate thread of execution in the processor.

8. The method of claim 7, further comprising:
generating the parallel execution group by comparing an address stored in each separate vector register slot or targeted by each separate thread;
identifying separate vector register slots or threads targeting a same address;
combining the separate vector register slots or threads targeting the same address into the parallel execution group; and
setting a pointer to point to a first separate vector register slot or thread that targets an address different than the address of the target portion of code.

9. The method of claim 8, wherein, in a subsequent execution of the iterations associated with the separate vector register slots or threads, a subsequent parallel execution group is generated based on the setting of the pointer.

* * * * *